United States Patent [19]

Rose et al.

[11] 3,894,631

[45] July 15, 1975

[54] EGG TRANSFER MECHANISM

[75] Inventors: Boyd W. Rose; George W. Thornton, both of Riverside, Calif.

[73] Assignee: FMC Corporation, San Jose, Calif.

[22] Filed: Dec. 26, 1973

[21] Appl. No.: 428,168

[52] U.S. Cl. .................. 198/237; 198/32; 198/241
[51] Int. Cl. ............................................ B65g 47/26
[58] Field of Search .......... 198/32, 33 AD, 30, 237, 198/238, 241, 242, 243, 244

[56] References Cited
UNITED STATES PATENTS

| | | | |
|---|---|---|---|
| 3,040,869 | 6/1962 | Mumma | 198/33 AD |
| 3,370,691 | 2/1968 | Mosterd | 198/32 |

*Primary Examiner*—Evon C. Blunk
*Assistant Examiner*—Douglas D. Watts
*Attorney, Agent, or Firm*—R. S. Kelly; J. W. Edwards; C. E. Tripp

[57] ABSTRACT

An egg transfer mechanism is positioned at the discharge end of a continuously moving delivery conveyor to receive eggs arranged in a plurality of longitudinal lanes with the egg axes oriented horizontally and to transfer the eggs to a continuously moving distribution conveyor extending laterally from the delivery conveyor and having individual egg retaining pockets for carrying the eggs in a single file line with the egg axes oriented vertically. The egg transfer mechanism includes a plurality of egg transfer cups corresponding in number to the longitudinal egg lanes of the delivery conveyor. The transfer cups are spaced to receive the eggs with the major egg axes aligned horizontally. A transfer cup drive enables the transfer cups to be each driven so as to (1) dwell in an elevated horizontal position for receiving the eggs, (2) rotate downwardly accelerating to approximately the velocity of the distribution conveyor while moving therewith in generally the same direction of travel, (3) tilt longitudinally from a horizontal position to a downwardly inclined position during said rotative movement, and (4) transfer the eggs by gravity into the individual egg retained pockets of the distribution conveyor when moving at the speed of the distribution conveyor so as to not damage the eggs during the transfer operation.

14 Claims, 11 Drawing Figures

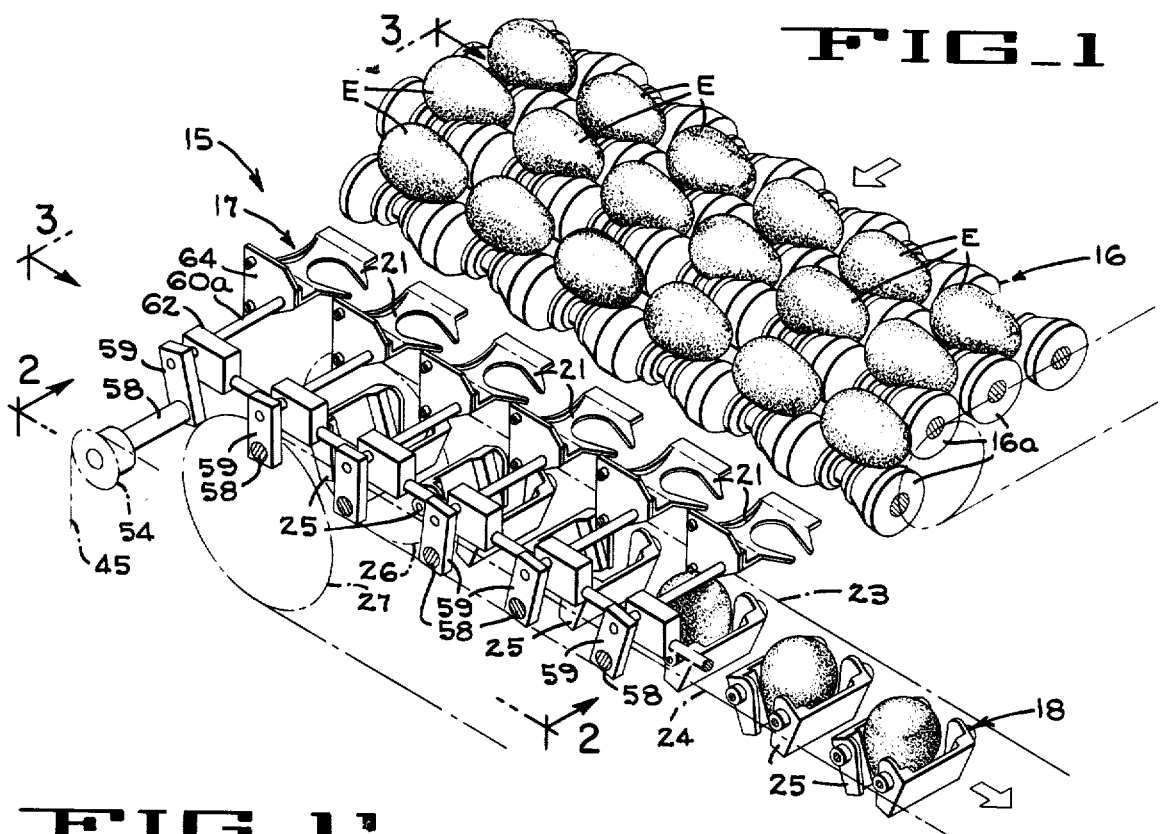
FIG_1
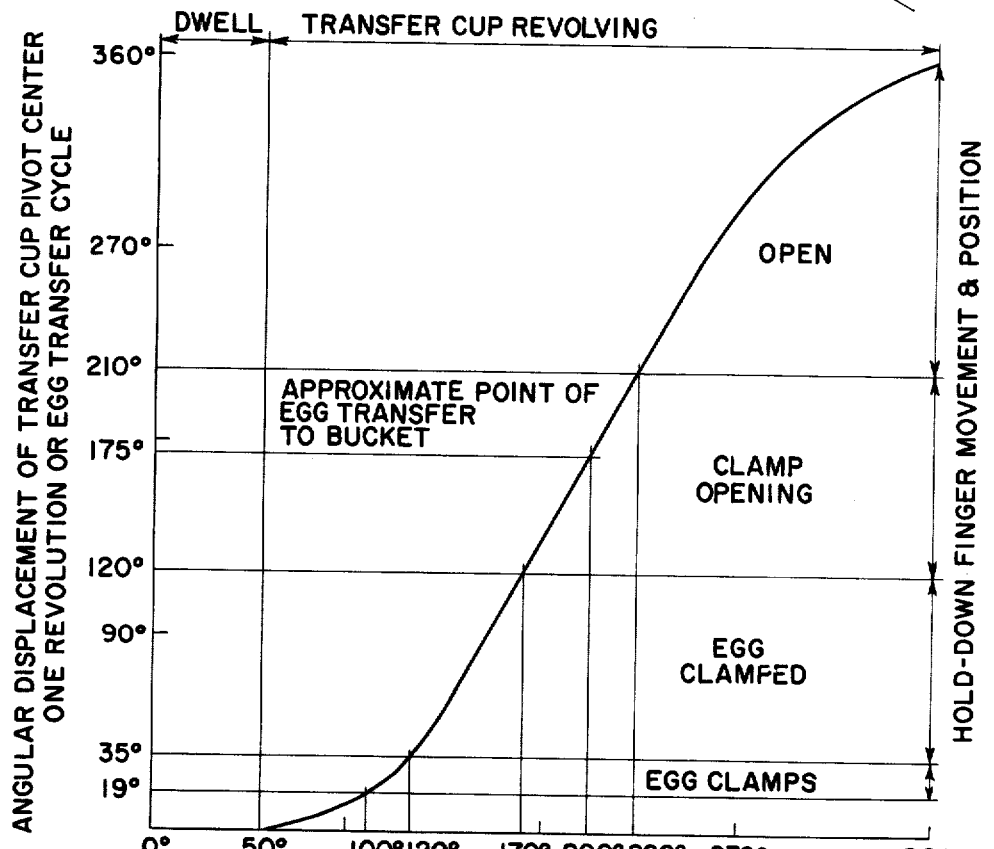
FIG_11

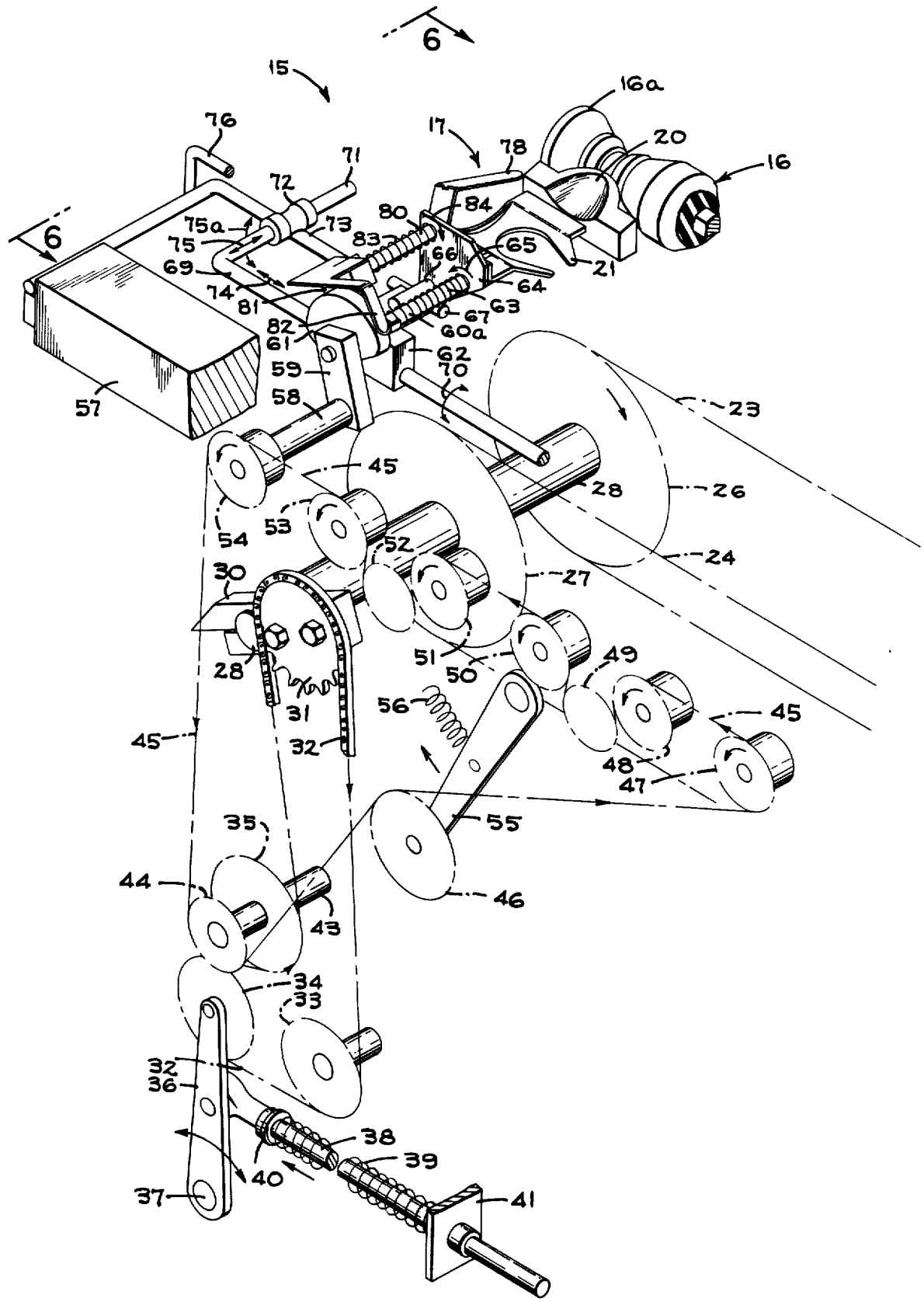

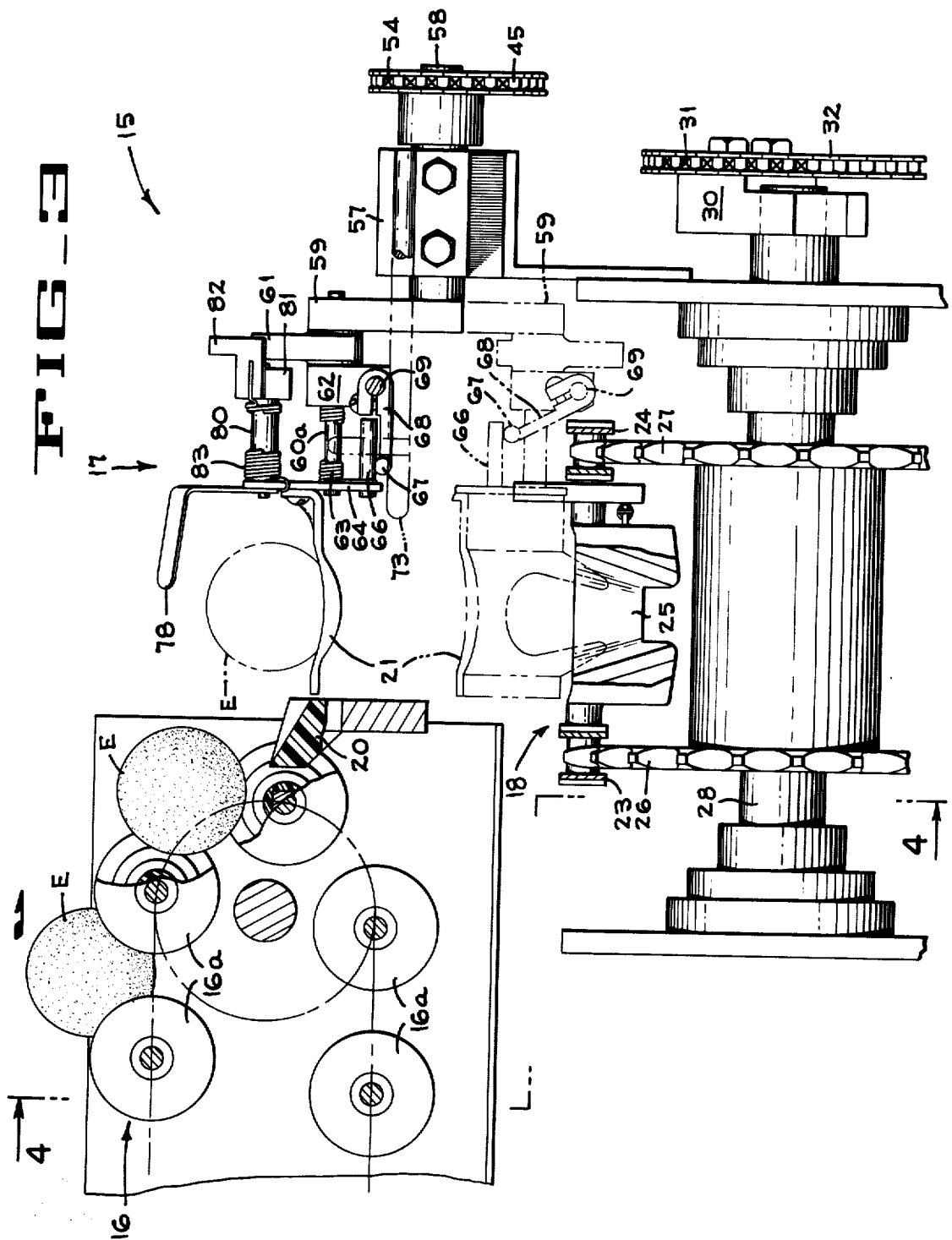

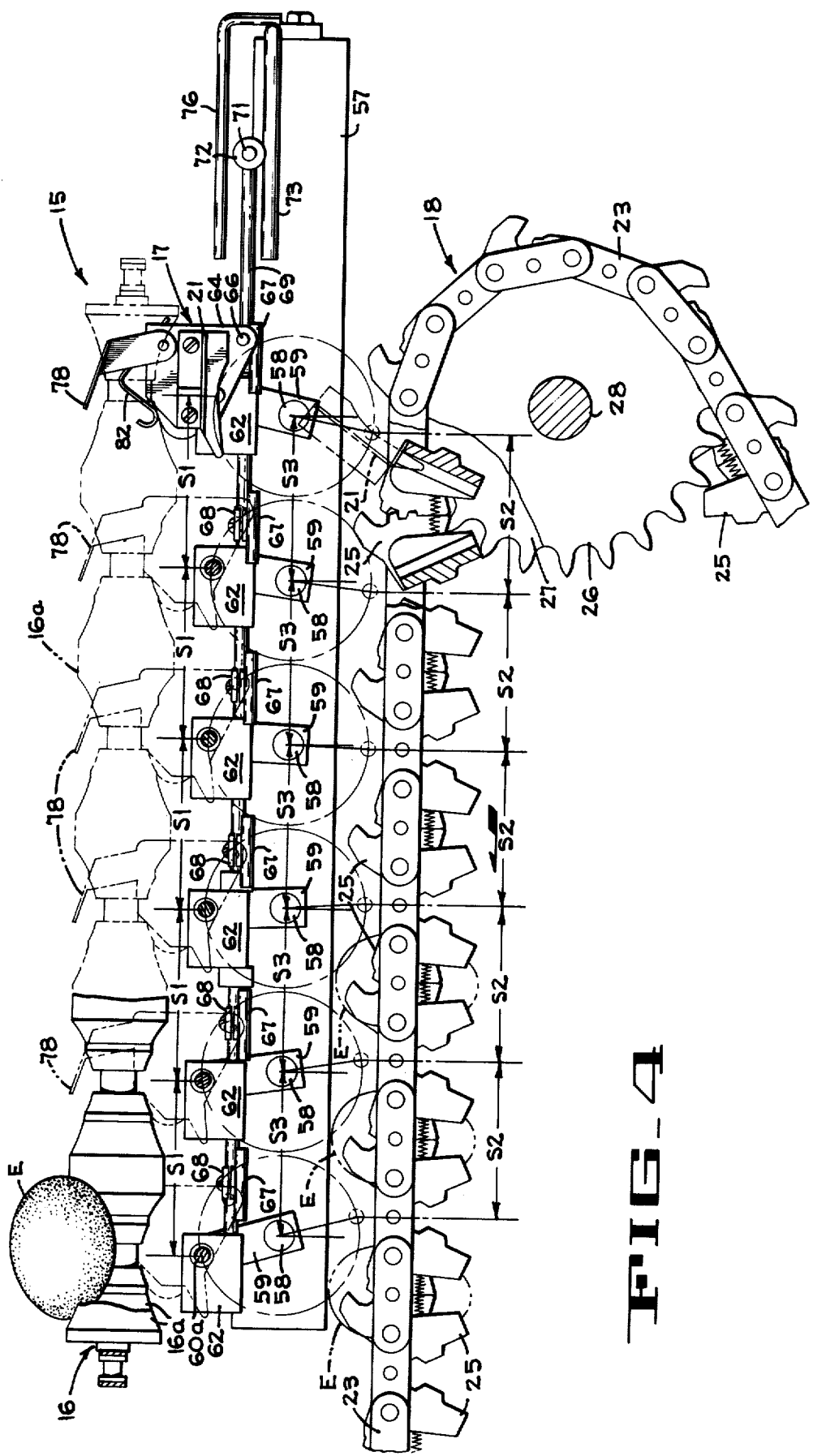

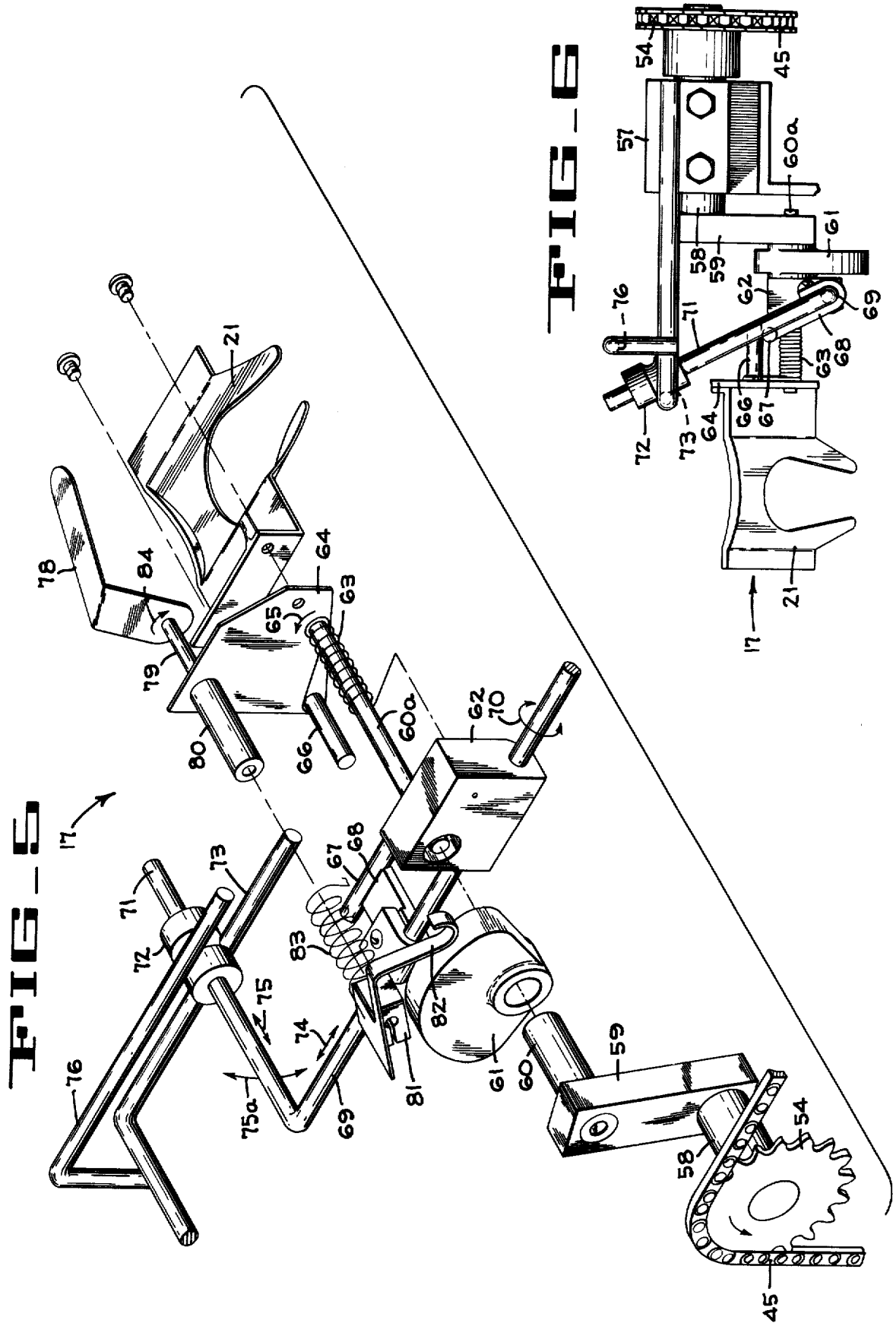

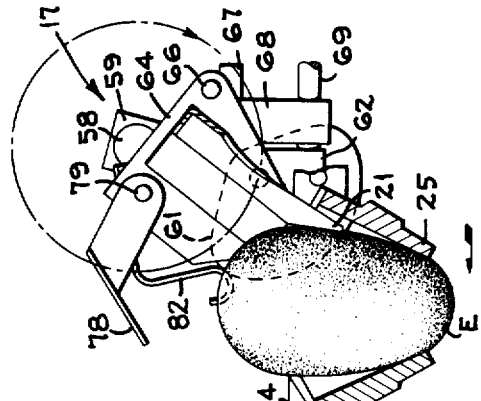
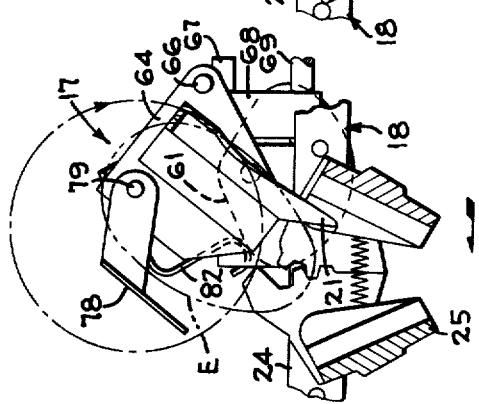
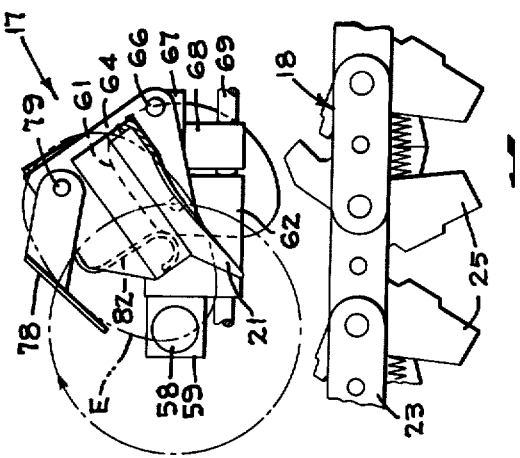
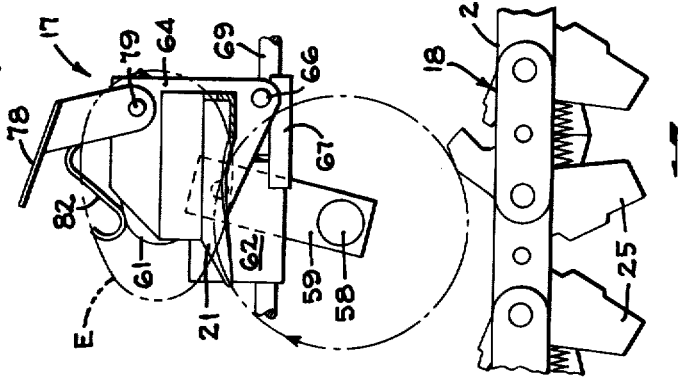

3,894,631

EGG TRANSFER MECHANISM

BACKGROUND OF THE INVENTION

1. Field of the Invention

This invention pertains to egg handling and conveying systems, and more particularly, it pertains to a mechanism for transferring eggs from a first continuously moving conveyor to a second continuously moving conveyor.

2. Description of the Prior Art

In automatic egg handling systems, eggs are normally conveyed in multiple lanes on conveyors. At certain egg processing stations, it is desirable to convey the eggs in single file, e.g., for weighing or sequential packing. Thus, it oftentimes becomes necessary to transfer eggs from a continuously moving multi-lane conveyor to a single lane conveyor. In order to attain a maximum egg processing rate and to simplify the driving arrangement this latter conveyor should also move continuously and, for ease of transfer, in a direction laterally of the multi-lane conveyor. It is desirable to confine the eggs in individual egg retaining pockets on the single lane conveyor so that they will be in a specific position and orientation for later processing operations. These requirements, however, provide problems in the egg transfer operation between the conveyors. For each transverse row of eggs advanced by the multi-lane conveyor, the single file conveyor must carry away a number of eggs corresponding to the number of longitudinal lanes of the multi-lane conveyor. If there are six longitudinal lanes of eggs on the multi-lane conveyor, then for each transverse row of eggs advanced the single lane conveyor must carry away six eggs. Thus, the velocity of the single lane conveyor must be considerably faster than the velocity of the multi-lane conveyor assuming that the eggs are spaced apart on each conveyor by substantially the same distance in the direction of egg movement. The requirement of such a high velocity for the single lane conveyor and the fact that eggs must be transferred into individual egg retaining pockets make the egg transfer difficult because of the potential impact stresses upon the fragile eggs as they are seated in the individual egg retaining pockets of the single lane conveyor.

U.S. Pat. No. 3,370,691 to Jacob H. Mosterd shows a device for transferring eggs from six lanes of a continuously moving delivery conveyor to a continuously moving single lane distribution conveyor having individual egg retaining members. Eggs on the delivery conveyor are oriented with their axes extending horizontally and transversely thereof, while the egg axes are vertically oriented on the distribution conveyor. The egg transfer device is a relatively complex and expensive mechanism which includes an endless chain with a series of grippers mounted thereon for handling the eggs during the transfer operation.

U.S. Pat. No. 2,895,274, issued July 21, 1959 to Harold J Mumma, discloses an egg transfer cup with an egg retaining finger which mechanism operates to lower an egg from a weighing mechanism to a continuously moving distribution conveyor and to deliver the egg to the conveyor so as to minimize the impact during transfers. The Mumma apparatus, because of its nature, is only used for the transfer of a single lane of eggs from a delivery conveyor to a transversely extending, single lane distribution conveyor.

SUMMARY OF THE INVENTION

In the present invention, an egg transfer mechanism receives eggs from a plurality of longitudinal lanes of a continuously moving delivery conveyor with the egg axes oriented horizontally and transversely of the delivery conveyor and operates to feed the eggs to a continuously moving distribution conveyor having individual egg retaining pockets wherein the eggs are conveyed laterally of the delivery conveyor in a single file line with the egg axes oriented vertically in egg retaining pockets on the distribution conveyor. The egg transfer mechanism includes a plurality of transfer cups with each transfer cup being arranged to receive eggs from one of the longitudinal lanes of the delivery conveyor. The mechanism further includes means for simultaneously driving the transfer cups so that they dwell in an elevated horizontal position for receiving the eggs, revolve downwardly accelerating to approximately the velocity of the distribution conveyor while moving therewith in the same direction of travel, and tilt longitudinally from a horizontal position to a downwardly inclined position for transferring the eggs by gravity into the individual egg retaining pockets of the distribution conveyor without damaging the eggs.

A special feature of the preferred embodiment of the invention is the fact that the egg transfer mechanism is arranged so that the spacing of the eggs can be different in the delivery conveyor than it is in the distribution conveyor. Thus, egg orientation, direction of movement, and spacing are all changed by the egg transfer mechanism of the present invention during the transfer operation, and the transfer mechanism can be utlized with conventional egg delivery and distribution conveyors.

BRIEF DESCRIPTION OF THE DRAWINGS

FIG. 1 is a diagrammatic isometric view of an egg handling system embodying the present invention.

FIG. 2 is an enlarged diagrammatic fragmentary view of a portion of the egg transfer mechanism of the present invention generally taken in the direction of the arrows 2—2 of FIG. 1.

FIG. 3 is an enlarged side elevation view, partially in section, taken generally in the direction of the arrows 3—3 of FIG. 1 and showing an egg transfer cup in its egg receiving position with the egg discharge position of the cup being shown in phantom lines.

FIG. 4 is a sectional view taken generally upon the line 4—4 of FIG. 3 but with portions of the delivery conveyor and transfer cups being broken away and/or shown in phantom lines and with the rotary paths of the transfer cups being indicated by phantom lines.

FIG. 5 is an exploded isometric view of a portion of the egg transfer mechanism shown in FIG. 2.

FIG. 6 is an enlarged end elevation view taken generally in the direction of the arrows 6—6 of FIG. 2 but showing the transfer cup in its downwardly rotated position.

FIGS. 7, 8, 9 and 10 are operational views of one of the transfer cups of the transfer mechanism feeding an egg into an egg retaining bucket of the distribution conveyor.

FIG. 11 is a timing diagram illustrating the relationship of angular displacement of the transfer cup pivot axis to the angular displacement of the distribution conveyor drive during one complete egg transfer cycle.

DESCRIPTION OF THE PREFERRED EMBODIMENT

With reference to FIG. 1, an egg handling system 15 is there shown which includes a delivery conveyor 16. This conveyor can be of the conventional grooved roller type including a plurality of parallel grooved, or grommeted rollers 16a mounted between a pair of endless conveyor chains and arranged to receive eggs in the pockets formed between the adjacent rollers. Such a conveyor is shown and described in U.S. Pat. No. 3,252,607 issued May 24, 1966 to Boyd W. Rose et al. In the present system, conveyor 16 is used for feeding eggs in a multiple number of lanes (six of such lanes being shown) to an egg transfer mechanism 17. The eggs are oriented on the delivery conveyor with their major axes extending horizontally and transversely of the delivery conveyor, and they maintain this orientation when delivered to the transfer mechanism. The latter device, upon reception of a row of eggs, revolves and tilts the eggs and feeds them into individual egg retaining buckets 25 of a conventional distribution conveyor 18 with the major axis of each egg being oriented vertically in its bucket on the distribution conveyor. Such conventional egg distribution conveyors having individual egg retaining buckets are disclosed, for example, in U.S. Pat. No. 2,895,274 issued July 21, 1959 to Harold J Mumma. As shown in FIG. 1, the distribution conveyor 18 extends at right angles to the delivery conveyor and is positioned at a lower elevation than the delivery conveyor so that the rows of eggs can be delivered thereto by gravitating out of the transfer mechanism. Both the delivery conveyor 16 and the distribution conveyor 18 are arranged to be continuously driven at uniform speeds during the operation of the system. Thus, the transfer mechanism of the present invention can be adapted to conventional egg handling conveyors without requiring any alteration to their driving means.

Looking now at FIG. 2, only a single egg lane portion of the delivery conveyor 16 and egg transfer mechanism 17 is there shown, but it will be understood that there are five additional lanes for feeding eggs each having structure corresponding to the delivery and transfer mechanism structure shown in FIG. 2. A bridge 20 is positioned at the discharge end of each lane of the delivery conveyor 16 for guiding eggs to roll about their horizontally oriented major axes from the delivery conveyor over the bridge and into a shallow transfer cup or cradle 21 of the egg transfer mechanism 17.

Positioned below each of the transfer cups 21 is the distribution conveyor 18 formed by two spaced endless sprocket chains 23 and 24 which support the series of individual egg retaining buckets 25 (FIG. 3) therebetween. The sprocket chains are trained about a pair of drive sprockets 26 and 27 adjacent to the delivery point of the eggs and a pair of driven sprockets (not shown) at the downstream end of the distribution conveyor. The drive sprockets are mounted upon a drive shaft 28 from which power is transmitted to a drive, that will subsequently be described, for driving the transfer mechanism 17 to revolve and tilt each transfer cup 21 so as to feed an egg therefrom into an egg retaining bucket 25 of the distribution conveyor.

The drive for the transfer mechanism 17, shown most clearly in FIG. 2, includes an offset clamp 30 that is attached to drive shaft 28 and extends radially therefrom in crank arm fashion. A drive sprocket 31 is rigidly bolted to the distal end of the offset clamp in a manner so as to revolve with the offset clamp about the axis of drive shaft 28. An endless drive chain 32 is trained about the drive sprocket 31, a fixed idler sprocket 33, a movable idler sprocket 34, and a fixed driven sprocket 35. The movable idler sprocket 34 is mounted upon a pivot arm 36 that pivots about a pin 37 in response to the orbital path of drive sprocket 31 and the restoring force applied by a connecting rod 38 having a compression spring 39 fitted axially thereabout between a collar 40 and a fixed bracket 41 through which the rod slides. The spring urges the connecting rod in the direction of the arrow (FIG. 2) so that all movement of drive chain 32 due to the continuous displacement of sprocket 31 will be in a direction so as to rotate sprocket 35 in a counter clockwise direction (as viewed in FIG. 2). Such movement will, however, be intermittent with a dwell period as determined by the various special orientation of the aforedescribed elements for a purpose which will be explained in greater detail hereinafter.

Driven sprocket 35 is securely mounted upon a rotatable shaft 43 which also has a drive sprocket 44 mounted thereon for rotation therewith. An endless drive chain 45 is trained about the drive sprocket 44, a movable idler sprocket 46, driven sprockets 47 and 48, an idler sprocket 49, driven sprockets 50 and 51, an idler sprocket 52, and driven sprockets 53 and 54. The drive chain 45 is continuously driven, but with an intermittent motion, in the direction indicated by the arrows in FIG. 2 by the drive sprocket 44, and slack in the drive chain is taken up by the movable idler sprocket 46 which is mounted at the distal end of a pivotable take-up arm 55 that is urged upwardly by a tension spring 56. Each of the driven sprockets 47, 48 50, 51, 53 and 54 controls the rotary movement of a separate transfer cup 21 within the transfer mechanism 17. It will be understood the structure connecting each driven sprocket 47–54 with a transfer cup 21 is similar to the structure shown in FIG. 2 for the sprocket 54 which drives the end transfer cup.

Driven sprocket 54 is mounted upon a shaft 58 that is journalled within bearings, not shown, supported by a frame member 57. A crank arm 59 is attached to the inner end of shaft 58 and is, therefore, arranged to be rotated in a vertical plane during operation of the transfer mechanism. An off-set sleeve 60 (FIG. 5) projects from the distal end of crank arm 59 parallel to the extended axis of the shaft 58, and a cam 61 is fixed to this sleeve so that it will rotate with the crank arm. The sleeve is journalled for rotation in a pivot block 62 and is arranged to rotatably receive (see FIG. 5) the projecting end of a support rod 60a which supports, at its distal end, a pivot plate 64. The transfer cup 21 is bolted (FIG. 5) to the flat face of the pivot plate 64, and a torsion spring 63 is secured about the rod 60a with one end attached to pivot block 62 and with the other end hooked over a pin 66 projecting from the pivot plate so as to urge the pivot plate to rotate in the direction of arrow 65 (FIGS. 2 or 5). The pin 66 projects outwardly from the pivot plate parallel with support rod 60a and is arranged to contact and be supported by a rod 67 during the rotary movement of the pivot plate. The rod 67 thereby limits pivotal movement of the plate in the direction of arrow 65 and relative translatory movement between the rod 67 and rod 60a causes the tipping movement of the transfer cup 21 with respect to the horizontally oriented pivot block 62.

The cup-tipping rod 67 is rigidly clamped by means of a clamp bracket 68, as shown in FIG. 5, upon an actuator rod 69 that extends longitudinally through the pivot block 62 at a lower elevation than the sleeve 60 and support rod 60a which extend transversely through the pivot block. Actuator rod 69 is rotatably received within the pivot block, as indicated by an arrow 70 (FIGS. 2 or 5), and has a perpendicularly projecting end portion 71 slidably fitted through a spool 72. The spool is circumferentially grooved and is arranged to fit about and to roll upon a guide rod 73 that is securely attached to the frame member 57 and is therefore fixed in position in a horizontal orientation. As crank arm 59 rotates, sleeve 60, support rod 60a, pivot block 62, and actuator rod 69 revolve in an orbital path accordingly, causing spool 72 to roll back and forth on the fixed guide rod 73, as indicated by an arrow 74 (FIGS. 2 and 5), and causing the end portion 71 of the actuator rod to oscillate in a vertical plane, as indicated by the arrow 75a, and to slide back and forth through sleeve 72, as indicated by an arrow 75 (FIGS. 2 and 5). When the actuator rod 69 is lowered, the rod 67 will project upwardly therefrom (FIG. 6) remaining in supporting contact with pin 66, while support rod 60 moves downwardly causing pivot plate 64 to rotate upon the support rod in a direction opposite to the direction of the arrow 65 (FIGS. 2 and 5). Thus, the transfer cup 21 is tilted to a downwardly inclined position (FIGS. 3 and 6) for transferring an egg by gravity into an individual egg retaining bucket 25 of the distribution conveyor 18. The torsion springs 63 associated with each transfer cup provide a force acting through pins 66 and rods 67 which maintain the spool 72 in position on the guide rod 73, it being understood that the actuator rod 69 extends the full length of the transfer mechanism and supports each of the transfer cup assemblies. A keeper rod 76 is mounted on the guide rod 73 and is arranged to extend over the end portion 71 of actuator rod 69 to prevent persons from inadvertently lifting upward on the end portion of the actuator rod when the transfer mechanism 17 is in the dwell (or egg-receiving) position and thereby upsetting the transfer cups 21.

A hold-down finger 78 extends transversely over each transfer cup 21 and is pivotable from an open egg receiving position (FIG. 7) to a closed egg retaining position (FIG. 8) to hold eggs in place upon the transfer cup during tipping until ready for release to drop the egg into an underlying egg retaining bucket 25. The hold-down finger is mounted upon a rod 79 (FIG. 5) that is rotatably received by and extends through the pivot plate 64 and a sleeve 80 attached to the inner face of the pivot plate. A clamp block 81 is securely mounted on the projecting end of rod 79, and a spring arm, or cam follower, 82 projects from the clamp block to follow the surface of the cam 61. A torsion spring 83 fits over sleeve 80 and is coupled between pivot plate 64 and clamp block 81 to urge the clamp block and rod to rotate in the direction of the arrow 84 (FIG. 2) to clamp an egg on the cup 21 and prevent it from dropping prematurely as the egg is tilted into a vertical position prior to discharge. Cam 61 is shaped so as to cause the spring arm 82 to move the hold-down finger 78 out of its egg retaining position at the time that the transfer cup 21 reaches the position of egg discharge (FIG. 9).

The timing diagram, shown in FIG. 11, illustrates the relationship between one cycle of the distribution conveyor drive, which is equivalent to the linear travel of six egg retaining buckets 25 past a given point, and one cycle of angular displacement of the transfer cups 21. For the first 50° of angular displacement of the distribution conveyor drive, the transfer cups dwell in an egg loading position with no displacement. During this time the eggs are delivered from the delivery conveyor 16 to the transfer cups 21. Between about 100°–120° of angular displacement of the distribution conveyor, which is equivalent to about 18°–35° of angular displacement of the transfer cups, the hold-down fingers 78 have been moved under the urging of the associated torsion springs 83 from their open positions to their clamping or egg-retaining positions. The exact position where the eggs are clamped will, of course depend upon the sizes of the eggs in the cups. At about 170° of angular displacement of the distribution conveyor, or about 120° of angular displacement of the transfer cups, the hold-down fingers start to open and eggs are transferred to the egg retaining buckets 25 when the angular displacement of the transfer cups reaches about 175° or so depending upon the sizes of the eggs. The hold-down fingers 78 reach a maximum open position at about 220° angular displacement of the distribution conveyor or about 212° angular displacement of the transfer cups and remain in the open position during completion of the operating cycle.

With reference to FIG. 3, it will be noted that transfer cups 21 are spaced opposite each egg delivery lane of the delivery conveyor 16 for receiving eggs oriented with their major axes extending horizontally and transversely of the delivery conveyor. It is a special feature of the invention that the transfer mechanism is arranged to operate with a difference in the spacing of the eggs between the delivery conveyor 16 and the distribution conveyor 18. As shown in FIG. 3, there are five equal spaces $S_1$ between the pivot axes of the six transfer cups. By way of example, a typical spacing for eggs on a roll conveyor aligned with their major axis extending horizontally is about 2¾ inches. When the eggs are oriented so that their major axes extend vertically, the spacing requirements are less. By way of example, 2½ inches is a typical spacing between the centers of the egg retaining buckets 25 of a distribution conveyor 18. Thus, with the apparatus of the present invention, the transfer mechanism must reduce the spacing of the eggs during the transfer movement as well as reorient the eggs. It will be noted that the pivot axes of the transfer cups 21 are arranged at spacing $S_1$ in the upper egg receiving positions, which spacing represents the spacing of the eggs on the delivery conveyor, and at spacing $S_2$ in the lower egg discharging positions, which latter spacing represents the spacing of the eggs on the distribution conveyor. Although each transfer cup rotates through an arc of 180° between such positions, the spaces $S_1$ are larger than the spaces $S_2$ because of the differences in the initial orientations of the crank arms 59. As shown in FIG. 3, the cranak arms are fanned out about the center of the transfer mechanism so that the spaces $S_1$ will be a maximum and spaces $S_2$ will be a minimum. The spacing between the crank shafts 58, designated as $S_3$ in FIG. 6, is set at exactly half way between $S_1$ and $S_2$, i.e., 2⅝ inches in the example given.

Operation of a transfer cup 21 is illustrated in FIGS. 7-10. An egg E is received with the transfer cup in an upper position as shown in FIG. 7. Hold-down finger 78 is then urged inwardly to grip the egg as the transfer cup pivots downwardly as shown in FIG. 8. When the transfer cup is aligned over an egg retaining bucket 25, the hold-down finger is elevated to a position, such as shown in FIG. 9, where the egg will slide into the underlying retaining bucket, as shown in FIG. 10. As shown in the drawings, the initial movement of the egg is primarily downwardly while the egg is being oriented into a vertical position, but the latter portion of its movement with the transfer cup is primarily in the horizontal direction in order to bring the horizontal speed of the egg up to the speed of the distribution conveyor in order to minimize damage to the egg during the transfer.

All six transfer cups 21 operate together so that six egg retaining buckets 25 of the distribution conveyor 22 are filled at one time. The distribution conveyor then continues to move while the transfer cups are brought back to their dwell positions, loaded, and brought back to their egg discharging positions. This continued movement of the distribution conveyor will bring the adjacent six empty egg retaining buckets into alignment with the transfer cups 21 to permit a subsequent transfer of eggs to occur.

Although the best mode contemplated for carrying out the present invention has been herein shown and described, it will be apparent that modification and variation may be made without departing from what is regarded to be the subject matter of the inventon.

What is claimed is:

1. In an egg handling system having a continuously moving delivery conveyor for feeding eggs to a discharge end thereof in a plurality of longitudinal lanes defined by longitudinally spaced rows of pockets with the egg axes oriented horizontally and extending transversely of the delivery conveyor; and a continuously moving distribution conveyor having a row of individual egg retaining pockets for receiving eggs near the discharge end of the delivery conveyor and conveying the eggs laterally therefrom in a single file line with the egg axes oriented vertically in the egg retaining pockets; wherein the improvement comprises an egg transfer mechanism including a plurality of transfer cups located adjacent the discharge end of the delivery conveyor and corresponding in number to the longitudinal egg lanes of the delivery conveyor to receive eggs therefrom in horizontal axial orientation; means mounting each of said transfer cups for movement in an orbital path which lies in a generally vertically extending plane directly adjacent to the discharge end of the delivery conveyor, said distribution conveyor being positioned in said plane directly below the lowermost positions of said orbital paths; and means for substantially simultaneously driving each transfer cup in its orbital path so as to cause the cup to dwell in an elevated horizontal position for receiving an egg, to revolve downwardly accelerating to approximately the velocity of the distribution conveyor while moving therewith in the same direction of travel, and to tilt from a horizontal position to a downwardly inclined position for transferring the egg by gravity into an individual egg retaining pocket of the distribution conveyor without damage to the egg.

2. In an egg handling system as described in claim 1 wherein said means for simultaneously driving each transfer cup is driven by the distribution conveyor.

3. In an egg handling system as described in claim 1 wherein said means for simultaneously driving each transfer cup includes a plurality of driven sprockets, each driven sprocket being interconnected with a transfer cup for revolving the transfer cup about the axis of the driven sprocket, a drive sprocket, a drive chain trained about the drive sprocket and driven sprockets for transmitting rotation from said drive sprocket to said driven sprockets, and means for intermittently driving the drive sprocket.

4. In an egg handling system as described in claim 3 wherein said means for intermittently driving the drive sprocket includes a driven sprocket interconnected for rotation with the intermittently driven drive sprocket, a shaft driven at a uniform speed and synchronized with the movement of said delivery and distribution conveyors, a crank arm mounted upon said shaft, a drive sprocket fixed to the distal end of the crank arm, a drive chain trained about the drive sprocket on the crank arm and engaging the driven sprocket interconnected with the intermittently driven drive sprocket, and means for taking up slack in the drive chain as the crank arm rotates.

5. In an egg handling system as described in claim 3 wherein each driven sprocket is interconnected with a transfer cup by a shaft projecting axially from the driven sprocket, a crank arm projecting radially from the shaft, a pivot plate attached to the transfer cup, means for pivotally mounting the pivot plate upon the crank arm, and means for resiliently urging the pivot plate to pivot in a given direction; said means for simultaneously driving each transfer cup further including a plurality of pins, one pin projecting from each pivot plate, and pin supporting means adapted to engage the pins projecting from the pivot plates and to resist the force of the resilient means urging the pivot plates to pivot in said given direction, said pin supporting means being mounted to move upwardly relative to the pivot plates as the pivot plates revolve downwardly thereby pivoting the pivot plates and transfer cups in a direction opposite to said given direction so that the transfer cups will be inclined downwardly for transferring the eggs to the distribution conveyor.

6. In an egg handling system as described in claim 1 wherein said means for simultaneously driving each transfer cup includes means for causing each transfer cup to revolve in an orbital path in a vertical plane, and means for pivoting the transfer cup from a horizontal position at the zenith of the orbital path to a position inclined downwardly in the direction of revolution at the radii of the orbital path.

7. In a egg handling system as described in claim 1 wherein said transfer mechanism further includes means for retaining an egg in each transfer cup during movement of the transfer cups from egg receiving positions to positions for transferring the eggs to the distribution conveyor.

8. In an egg handling system as described in claim 7 wherein said means for retaining an egg in each transfer cup includes a plurality of hold down fingers, one finger extending transversely over each transfer cup and being mounted for movement between an open egg receiving position and a closed egg retaining position, and cam operated control means for opening and closing the hold down fingers in timed relationship with the movement of the transfer cups.

9. In an egg handling system as described in claim 1 wherein said transfer cups are spaced to receive eggs from the delivery conveyor at a predetermined spacing and the egg retaining pockets of the distribution conveyor are spaced at a lesser spacing than the said predetermined spacing, said transfer cups being arranged to simultaneously receive eggs from the delivery conveyor and to thereafter tilt to transferring positions with vertical inclinations that converge downwardly relative to each other to compensate for the egg spacing variation between the delivery conveyor and the distribution conveyor.

10. A mechanism for transferring eggs from the discharge end of a horizontal delivery conveyor which delivers a plurality of eggs with their axes aligned horizontally in rows of pockets extending transversely of the delivery conveyor, said mechanism comprising a plurality of transfer cups corresponding to the number of pockets in each transversely extending row of said delivery conveyor; each of said transfer cups being arranged to receive an egg with its axis aligned horizontally upon discharge from said delivery conveyor; and means for simultaneously driving the plurality of transfer cups so that the transfer cups dwell in a horizontal position as a row of eggs is received from the delivery conveyor and then are rotated so that the major axis of each of the eggs is rotated from a horizontal orientation to a substantially vertical orientation and the egg velocity is accelerated for transferring the egg into a pocket of a moving distribution conveyor without damage to the egg.

11. Apparatus for transferring eggs from a first continuously moving conveyor wherein said eggs are aligned in a plurality of transversely extending rows of pockets to a second continuously moving conveyor which comprises a plurality of aligned pockets to receive said eggs and which is arranged to convey said eggs in single file in a direction extending transversely of the direction of movement of said first conveyor, said apparatus comprising a plurality of transfer devices positioned between said first and second conveyors with the number of said transfer devices corresponding to the number of pockets in each transversely extending row of said first conveyor, said transfer devices being aligned with the pocket on said first conveyor so as to receive the eggs upon discharge from said first conveyor, cradle means on each of said transfer devices for receiving an egg generally oriented with its longitudinal axis extending in a horizontal plane, and means for substantially simultaneously moving each of said cradle means in an orbital path so that each cradle means is stationary when an egg is received from said first conveyor and each cradle means is rotated about a transverse axis during its movement in said orbital path to rotate the egg into a generally vertical orientation for deposit into a pocket on said second conveyor, said orbital paths lying in a generally vertically extending plane directly adjacent to the discharge end of the first conveyor, said second conveyor being positioned in said plane directly below the lowermost positions of said orbital paths.

12. Apparatus for transferring eggs according to claim 11 wherein said last named means operates so as to accelerate the eggs in said cradle means in the direction of movement of said second conveyor to raise the speed of the eggs in said direction to approximately that of said second conveyor in order to facilitate the transfer of eggs thereto.

13. Apparatus for transferring eggs according to claim 11 including a hold down finger associated with each of said cradle means for clamping an egg in said cradle means during the rotational movement of said cradle means, and cam means for moving each of said hold down fingers away from their associated cradle means after the egg has been rotated out of its initial horizontal orientation in order to permit the egg to gravitate out of the cradle means.

14. Apparatus for transferring eggs according to claim 11 wherein the spacial orientation of each of said transfer devices is slightly different so that the relative spacing of said eggs will be changed during the transfer from said first to said second conveyors.

* * * * *